United States Patent [19]
Magnante et al.

[11] 3,733,553
[45] May 15, 1973

[54] RECEIVER FOR PULSE MODULATED SIGNALS

[75] Inventors: Frank A. Magnante, Yorktown Heights; Donald J. Toman, Pleasantville, both of N.Y.

[73] Assignee: Tull Aviation Corporation, Armonk, Del.

[22] Filed: July 29, 1971

[21] Appl. No.: 167,180

[52] U.S. Cl. .................................325/321, 325/404
[51] Int. Cl. ..............................................H03c 1/00
[58] Field of Search......................325/326, 321, 404, 325/408, 42, 411, 323, 324; 323/66

[56] References Cited

UNITED STATES PATENTS

| | | | |
|---|---|---|---|
| 3,662,290 | 5/1972 | Elliott | 325/404 |
| 3,394,315 | 7/1968 | Gray | 325/404 |
| 3,162,801 | 12/1964 | Bogotch et al. | 325/408 |

*Primary Examiner*—Thomas A. Robinson
*Attorney*—Curtis Ailes

[57] ABSTRACT

The receiver includes a peak detector for automatically limiting the gain of the receiver to prevent overloading and distortion. A normalizing circuit is provided between the detector stage and the audio stage which comprises a variable scale factor circuit operable to maintain the signals supplied to the audio stage at a level corresponding to a substantially constant direct current voltage level component derived from the carrier signal.

11 Claims, 4 Drawing Figures

INVENTORS
FRANK A. MAGNANTE
DONALD J. TOMAN

BY Curtis Ailes
ATTORNEY

RECEIVER FOR PULSE MODULATED SIGNALS

This invention relates to an improved radio receiver for receiving pulse modulated carrier signals, and the invention more particularly relates to receiver circuit improvements for the purpose of more effectively providing an accurate, undistorted, output signal.

The term pulse modulation as used in this specification includes both pulse amplitude modulation and pulse duration modulation. In pulse amplitude modulation, the carrier is amplitude modulated, just as in continuous wave transmission, but the signal is transmitted by short bursts of modulated carrier waves rather than by continuous carrier waves. In pulse duration modulation, short bursts of carrier waves are transmitted at constant amplitude, but the duration of individual bursts of carrier is varied to carry the modulation signals. In both types of pulse modulation, the ratio of the peak carrier amplitude to the average carrier amplitude is quite high. With such a characteristic, and with ordinary direct current carrier level sensitive automatic gain control circuits, which are sensitive to average carrier amplitude, there is a tendency to overload the amplifiers of the receiver and to cause distortion and "clipping" of the signals. The term "clipping" is meant to signify the complete loss of the higher amplitude portions of the carrier signal. This is particularly serious in the case of pulse amplitude modulation, but it is also a serious source of loss of signal information, and a source of serious distortion with pulse duration modulation.

Accordingly, it is one object of the present invention to provide an improved receiver for pulse modulated signals in which clipping of the signal peaks is prevented.

In pulse modulated receiver systems, having a high peak-to-average signal ratio, it has been found to be very difficult to provide a uniform, normalized, audio output in which the audio signal amplitude has a specific relationship to the average DC amplitude of the carrier. The requirement for such a normalized output is particularly desirable in aircraft guidance systems such as the so-called instrument landing systems (ILS), for instance.

The receiver of the present invention is particularly effective for radio navigation systems for vehicles such as aircraft. Such systems may include, for instance, the so-called instrument landing system (ILS) in which a transmitter sets up signal patterns enabling a vehicle such as an aircraft to follow a prescribed azimuth guidance course. Such a system may also define a particular glide slope course. In such systems, the prescribed path is normally determined and set by the emission of signals from the transmitter having different modulation frequencies (usually 90 and 150 cycles) which predominate in the transmitted beams on opposite sides of the prescribed path. The receiver must then determine the center of the path by comparing the relative amplitudes of the two different modulation frequencies. It is very important, for the maximum accuracy of such systems, that the signals should not be distorted, and that the signals should be essentially normalized or calibrated so that the relative modulation amplitudes are accurately measured. The requirements for accurate calibration and normalization of the receiver are particularly difficult to satisfy when the transmitter signals are pulse modulated.

Accordingly, it is another object of the present invention to provide an improved receiver for pulse modulated signals which provides a uniform and normalized audio output.

It is another object of the invention to provide a receiver which is capable of receiving pulse modulated carrier signals, demodulating and amplifying such signals without peak clipping, and providing a normalized audio output, and which also is capable of alternatively receiving continuous carrier wave amplitude modulated signals.

In a patent application Ser. No. 104,668 filed by Donald J. Toman and Lloyd J. Perper on Jan. 7, 1971 for a SCANNING BEAM GUIDANCE METHOD AND SYSTEM, which is assigned to the same assignee as the present application, there is described a scanning beam guidance method and system, in one form of which individual space related radio guidance beams are switched or commutated at different beam positions, providing a pulse modulated signal from each beam position. The system is primarily intended for aircraft guidance. A single carrier generator is employed, and the individual bursts of carrier from the various beam positions are interlaced so that only one burst of carrier is being emitted from one beam position at any instant of time. The beam at each beam position is independently modulated. In such a system, there may be as many as five or more individual beam positions. Accordingly, the fraction of the total time in which the receiver receives a strong signal (sometimes referred to herein as the duty cycle) may vary over a wide range, depending upon the position of the aircraft receiver in relation to the various beams. If the receiver is in the center of the beam pattern, it may receive three or more of the beam signals with substantially equal amplitudes, and the duty cycle may be close to 30 percent, for instance. On the other hand, if the receiver is off to one side of the beam pattern, only one strong carrier signal may be received, the carrier signal may be received strongly from only one beam position and the duty cycle may be 10 percent or less. Accordingly, in such a pulse modulated scanning beam system, the duty cycle may vary drastically, and consequently the peak-to-average ratio of the carrier amplitude is not only high, but may vary over a wide range.

Accordingly, it is another object of the present invention to provide a receiver for pulse modulated carrier signals from a commutated scanning beam transmitter system which avoids the problem of peak clipping, and which provides uniform normalized audio outputs in spite of a widely varying duty cycle.

In carrying out the invention in one form thereof, there is provided an improved radio receiver for receiving pulse modulated carrier signals comprising at least one radio frequency amplifier, a detector stage, and at least one audio stage. A peak detector circuit is connected to receive signals from said audio frequency amplifier and operable to detect signal peaks and connected in a control loop to automatically control the gain of said radio frequency amplifier to prevent overloading of the receiver to thereby prevent signal distortion and clipping. A normalizing circuit is connected between said detector stage and said audio stage, said normalizing circuit comprising a variable scale factor circuit means connected to receive signals from said detector stage. Said normalizing circuit also includes a normalizing amplifier connected to supply signals to said audio stage, and means serially connecting said normalizing amplifier to receive signals from said variable scale factor circuit means. A means is connected from the output of said normalizing amplifier to control said variable scale factor circuit means, said scale factor circuit means being operable in response to the direct current level component of the output of said normalizing amplifier to vary the scale factor to maintain said direct current level component substantially constant.

Figure 4:
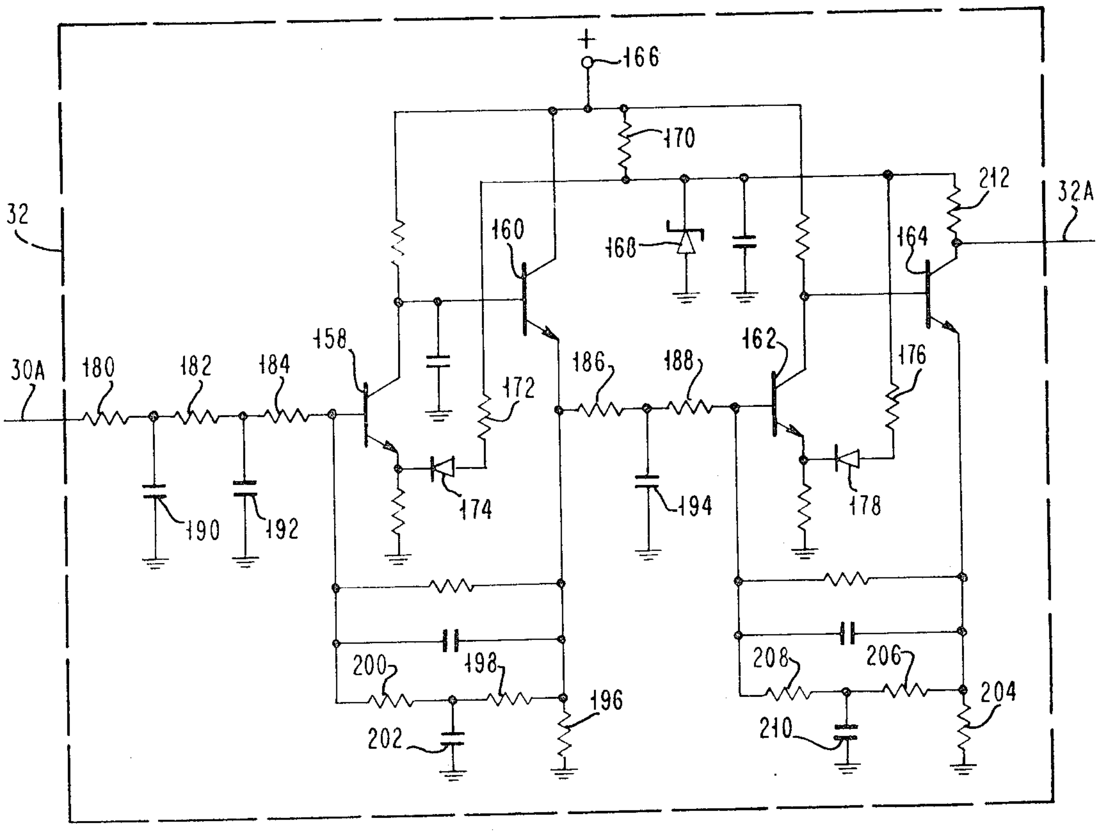
Figure 3:
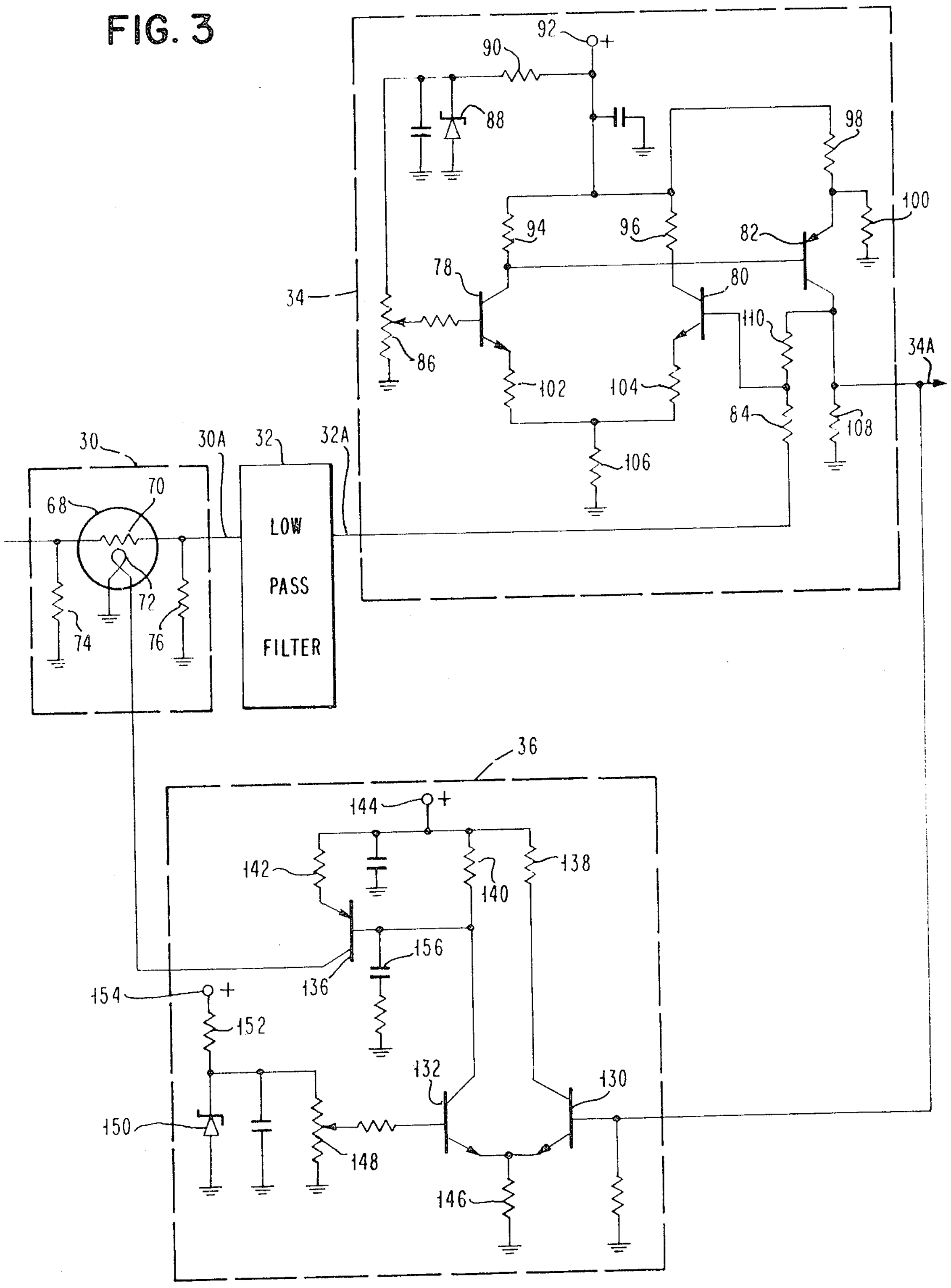
FIG. 3 is a detail circuit diagram of a preferred form of the normalizing circuit which forms a portion of the receiver of FIG. 1.

And FIG. 4 is a detail circuit diagram of a preferred form of the low pass filter which forms a part of the normalizer circuit of FIG. 3.

Figure 1:
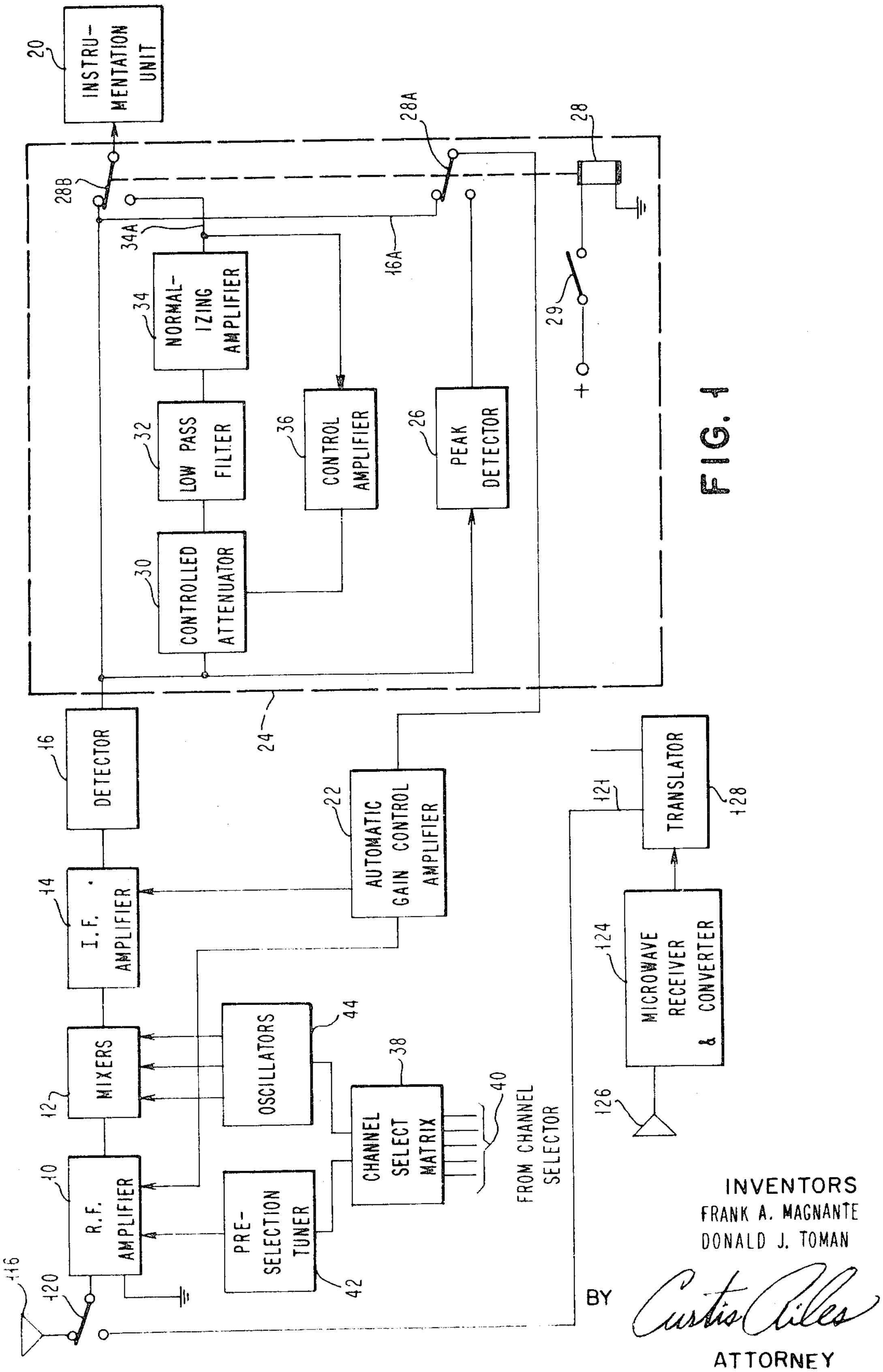
FIG. 1 is a schematic block diagram of a radio receiver in accordance with the teachings of the present invention.

Referring more particularly to FIG. 1, there is shown (sometimes referred to hereinafter as the audio stage) a receiver which may comprise, for instance, the localizer guidance receiver portion of an ILS aircraft guidance system. The receiver includes a radio frequency amplifier 10, mixers generally indicated at 12, and an intermediate frequency amplifier 14. The intermediate frequency amplifier 14 operates at a radio frequency, and accordingly may be also referred to hereinafter as a radio frequency amplifier. The receiver further includes a detector stage 16, the output of which is connected through a relay switch lever 28B to an instrumentation unit 20 to provide a visual instrument output giving the localizer azimuth control information. An automatic gain control amplifier 22 is connected to control the gain of both of the radio frequency amplifiers 10 and 14 in response to a signal which may be obtained from the output of detector 16 through a relay switch lever 28A.

As described thus far, exclusive of the relay switch levers 28A and 28B, the receiver may be of a construction which has been generally known prior to the present invention, and which is commonly used for continuous carrier wave signals.

In accordance with the present invention, circuits contained within the dotted box 24 are incorporated in the receiver to render the receiver more effective in handling pulse modulated signals. These circuits may be collectively referred to as gain setting and normalization circuits. They include a peak detector circuit 26 which is connected to receive the output signal from detector circuit 16, and arranged to be connected through the relay switch lever 28A to supply the input signal to the automatic gain control amplifier 22. The peak detector circuit 26 preferably has a fast rise and slow decay characteristic such that it sets the automatic gain control amplifier signal to a level determined in terms of the last previously detected maximum signal peak. This assures that the gains of the radio frequency amplifiers 10 and 14 will be set so that those amplifiers will not be overloaded. This prevents distortion and "clipping" of the received signals. To accomplish this, the combination of the peak detector 26 and the gain control amplifier 22 sets the gain at a level somewhat lower than it would be set by the gain control amplifier alone in response to pulse modulated signals having a high peak-to-average ratio.

The gain setting and normalization circuits also include a normalizing circuit which comprises a controlled attenuator 30, a low pass filter 32, a normalizing amplifier 34, and a control amplifier 36 connected from the output 34A of the normalizing amplifier 34 to control the controlled attenuator 30. The controlled attenuator 30 and control amplifier 36 are sometimes collectively referred to hereinafter as a variable scale factor circuit. The average rectified direct current voltage level derived from the carrier signal and available at the output 34A of amplifier 34, is used by the control amplifier 36 to control the attenuator 30. These elements form a closed control loop which operates to maintain the direct current voltage component of the output of amplifier 34 at a substantially constant value. This normalizes the audio output from the amplifier 34, making the audio output signals independent of variations in the peak-to-average ratio of the pulse modulated input signals, and independent of the duty cycle on which the input signals are supplied to the receiver. Thus, the gain setting and normalization circuits 24 provide the receiver with a proper gain setting to avoid clipping, and with automatically calibrated, standardized, and normalized audio signal outputs. This is particularly important in navigation guidance systems where the relative strength of two audio signals provide the guidance information.

The low pass filter 32 preferably has an upper frequency limit which is above the audio frequencies used as outputs in the system, but below the pulse modulation commutation frequency. Thus, this filter eliminates the undesired commutation frequency as a factor in the output to thereby avoid distortion of the audio output, and also to provide a more accurate determination of the average direct current voltage level of the rectified carrier for the control amplifier 36.

In the system as shown in FIG. 1, the receiver may be employed for receiving continuous wave signals, or for pulse modulated signals. For receiving continuous wave signals, the relay switch levers 28A and 28B are maintained in the position shown, and the automatic gain control amplifier 22 is supplied with a signal directly from detector 16 through connection 16A and relay switch lever 28A. Similarly, the output of detector 16 is provided directly through relay switch lever 28B to the instrumentation unit 20. Thus, the gain setting and normalization circuits 24 are not effective in the circuit. However, when pulse modulated signals are to be received, a switch 29 is closed, energizing the relay 28, and shifting the connections of relay switch levers 28A and 28B so that the automatic gain control amplifier 22 is supplied with its signal through peak detector 26, and the instrumentation unit 20 is supplied with its signal through the normalization circuit including amplifier 34.

When the relay 28 is in the released position, as illustrated in the drawing, in which the gain setting and normalization circuits 24 are not effective, the receiver substantially resembles receivers previously known, before the advent of the present invention. For instance, the receiver may conform exactly to the localizer receiver portion of the Collins Radio Model 51RV-1 VOR/ILS receiver manufactured by the Collins Radio Company of Cedar Rapids, Ia. The localizer portion of the receiver is more specifically identified as the 51X–4 VOR/LOC receiver and it is described in the third printing (July 1967) of the Overhaul Manual (with illustrated parts catalog) for the Collins 51RV–1 VOR-/ILS receiver published by the Collins Radio Company and copyrighted in 1963, 1964, 1965. The localizer receiver is particularly illustrated in FIG. 814 of that Manual.

The gain setting and normalization circuits 24 may simply be added to a receiver such as the above-identified Collins localizer receiver, without interfering with the normal operation of that receiver when it is employed for the previously commonly used continuous wave amplitude modulated localizer radio signals. However, when pulse modulated signals are to be received, the relay 28 may be energized and the receiver reception for pulse modulated signals is much improved by those circuits.

However, a similar configuration of the receiver may be employed, if desired, in which the relay 28 is omitted, and the peak detector 26 is permanently connected to the automatic gain control amplifier 22 (they may actually be combined), and the output of the normalizing amplifier 34 is permanently connected to the instrumentation unit 20. With such a configuration, the gain setting and normalization circuits 24 automatically accommodate to pulse modulated signals, or to continuous wave carrier modulated signals, the peak detector 26 being fully effective to set an appropriate gain for the radio frequency amplifiers, and the normalizing circuit being fully effective to normalize the output to the instrumentation unit 20, whether a continuous wave, or a pulse modulated carrier is employed. The only problem is that the characteristics of the filter 32 may have to be changed or adjusted if the receiver is employed for other functions in addition to the localizer ILS functions. Such functions may include VOR (VHF omnidirectional range) and voice communications.

The receiver will generally include a channel selection matrix 38 operable to receive channel selector signals from a suitable channel selector device at 40, and operable to control a pre-selection tuner 42 and mixer oscillators generally indicated at 44 for the purpose of selecting and tuning the receiver to a particular desired channel. These components are similar to those to be found in previously known ILS localizer receivers, such as the above identified Collins receiver.

The radio signals may be supplied from an antenna schematically shown at 116 through a switch lever 120. The receiver may be operable to receive continuous wave VHF localizer frequencies from the antenna 116 in the band from 108 to 112 MHz. Pulse modulated signals may also be received through antenna 116. However, as contemplated in accordance with the disclosure of the prior application Ser. No. 104,668 previously mentioned above, when pulse modulated signals are transmitted to the receiver, and particularly when such signals are transmitted by a scanning beam system, the transmission of information may be carried out at microwave frequencies. For that purpose, a separate microwave receiver antenna 126 is provided which supplies microwave signals to a microwave receiver and converter 124. The signals from receiver 124 are supplied through a translator 128 and a connection 121 to the radio frequency amplifier 10 through switch lever 120. These components translate the microwave signals to the VHF frequencies which are normally received by the amplifier 10. The microwave components 126, 124, 128, just described, and the switch 120, do not constitute a part of the previously known receiver system such as the Collins receiver previously identified above. However, such a microwave system forms a part of the subject matter described and claimed in a copending patent application Ser. No. 54,456 filed by Donald J. Toman and Warren Hundley on July 13, 1970 for a GUIDANCE SYSTEM, and assigned to the same assignee as the present application.

Where, as suggested above, the microwave receiver arrangement including receiver 124 is used for receiving pulse modulated signals, the switch 120 may be commonly actuated with the relay 28 which forms a part of the circuits 24. It will be understood, however, that, while illustrated as a conventional switch lever, the switch 120 may be an electronic switch rather than a mechanical switch.

The receiver of the invention is described in FIG. 1 entirely in terms of use for the ILS localizer function. However, it will be understood that the principles of the receiver may be employed for any receiver system which is intended to receive amplitude modulation signals. Furthermore, in a complete ILS receiver system, a separate receiver arrangement is required to receive the ILS glide-slope signals. However, the glide-slope receiver is not separately shown and described since it is substantially similar in construction.

Figure 2:
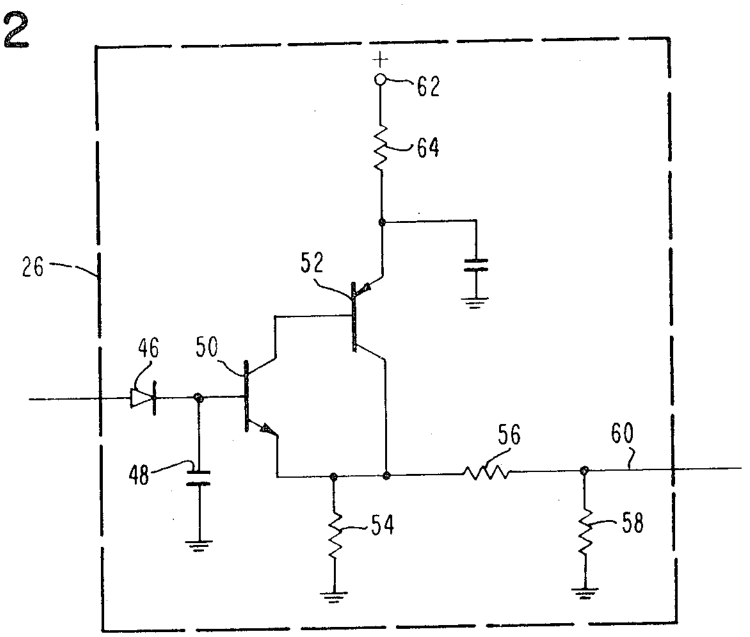
FIG. 2 is a detail circuit diagram of a preferred form of the peak detector circuit which forms a part of the receiver of FIG. 1.

FIG. 2 discloses a detailed embodiment of the peak detector circuit 26 of FIG. 1. As previously explained above, the peak detector circuit 26 has a characteristic of providing a fast rise and a slow decay so that it continuously measures and stores a voltage signal representative of the direct current level of the last previous carrier signal peak value. For this purpose, there is provided a diode 46 which permits the passage of signal peaks to a storage capacitor 48. The diode is effective to prevent the passage of any input signal unless it is a peak having a value which exceeds the voltage stored on the capacitor 48. Connected to the capacitor 48 there is a transistor circuit consisting of an NPN transistor 50 and a PNP transistor 52 connected in a circuit combination which is sometimes referred to as a "complementary Darlington circuit ". This circuit provides a high impedance for the capacitor 48 at the base of transistor 50 to provide for a slow discharge of the capacitor 48 through the emitter of transistor 50 and the emitter resistance 54. An appropriate fraction of the voltage across resistor 54 is provided by the scaling circuit consisting of resistors 56 and 58 for the output connection 60. The circuit is provided with power through a resistor 64 from a suitable positive d.c. source (not shown) connected at a terminal 62.

While other circuit constants may be used, in one specific embodiment of this circuit, the capacitance value of capacitor 48 was about 4,700 pico farads and the resistor 54 had a resistance value of about 500 ohms.

FIG. 3 illustrates details of the controlled attenuator 30, the normalizing amplifier 34, and the control amplifier 36 of the normalizing circuit of FIG. 1. The attenuator 30, in this specific embodiment, consists of a device 68 including a photoconductor 70 and a lamp 72 powered from the control amplifier 36. Whenever the DC level of the output from the normalizing amplifier 34 is too low, an increased current is supplied from the control amplifier 36 to the lamp 72, providing greater illumination upon the photoconductor 70, and thus increasing the conductivity of photoconductor 70 to increase the signal passing through the attenuator 30 (reducing the attenuation). A complete device 68 including the photoconductor 70 and the lamp 72 is commercially available from Raytheon under the trademark name "RAYSISTOR" used by that company. A satisfactory model for the embodiment of the invention shown here has been found to be the one presently bearing the model designation CK2072.

The attenuator 30 also preferably includes shunt resistors 74 and 76. Resistor 76 may have a high resistance value, such as 5000 ohms, to provide a high impedance input at 30A to the low pass filter 32. The details of a preferred form of the low pass filter 32 are shown and described in more detail below in connection with FIG. 4. This filter is preferably designed to pass the audio frequency signals which are desired, and to exclude higher frequencies. Where the system is used for pulse modulated signals, the upper frequency threshold of the filter is preferably below the commutation frequency at which the individual pulses of the pulse modulation are repeated.

The amplifier 34 includes transistors 78, 80, and 82. The incoming signal from the low pass filter 32 is connected at 32A through a resistor 84 to the base of the NPN transistor 80. The base of the opposite NPN transistor 78 is held at a substantially constant (adjustable) voltage supplied from a potentiometer 86 energized from a constant voltage source consisting of a zener diode 88 connected to receive voltage through a dropping resistor 90 from a positive direct current voltage source (not shown) connected at terminal 92. The source at terminal 92 also supplies the collectors of transistors 78 and 80 through resistances 94 and 96, and the emitter of the PNP transistor 82 through resistor 98. Resistor 98, together with an associated resistor 100, form a voltage divider to determine the transistor 82 emitter voltage level.

The emitter circuits of transistors 78 and 80 respectively include resistors 102 and 104, and a common resistor 106. In this preferred embodiment of the invention, the low pass filter 32 is an active filter which includes built-in amplifying means. This amplifying means includes an inverter providing a polarity inversion of the incoming signal. Accordingly, amplifier 34 also provides an inversion. In operation, if the incoming signal supplied through resistor 84 to the base of transistor 80 becomes less positive, that transistor tends to be partially turned off, reducing the current through the emitter circuit including resistor 104 and the common resistor 106. This reduces the voltage drop through the common resistor 106, reducing the potential of the emitter of transistor 78 and tending to turn on that transistor. The resulting increased collector current of transistor 78 causes an increased voltage drop across collector resistor 94, thus increasing the voltage between the emitter and the base of transistor 82 and causing transistor 82 to turn on and become more conductive. This increases the output voltage at the collector of transistor 82 by increasing the drop across the collector resistor 108. This output voltage change is fed back through a feedback resistor 110 to readjust the voltage level at the base of transistor 80 to a higher potential, thus counteracting the change provided by the original negative going input signal through resistor 84. The ratio of the resistance 110 to the resistance 84 determines the gain of the amplifier. In a preferred embodiment this ratio is 5 to 1. This amplification restores the strength of the signal, after the attenuation which takes place in the attenuator 30. Also, as previously explained above, because of the fact that the automatic gain control is responding to the peak detector, the average level of the direct current value of the signal received at the attenuator 30 may be low, particularly if the peak-to-average ratio is high. Accordingly, the amplification in amplifier 34 makes up for this low signal level.

The potentiometer 86, from which the base voltage of transistor 78 is obtained, is preferably adjusted so that the DC level output at connection 34A is substantially zero when the input signal from low pass filter 32 at resistor 84 is at a level corresponding to a zero DC level input to the attenuator 30. Thus, the audio stages can recognize the condition when there is no appreciable usable carrier present.

The output at connection 34A is connected as an input to the control amplifier 36, and is supplied as a voltage signal upon the base of a transistor 130 within that amplifier. The control amplifier also includes transistors 132 and 136. The collectors of transistors 130 and 132, and the emitter of transistor 136, are respectively supplied through resistors 138, 140, and 142 from a positive direct current voltage source (not shown) connected at terminal 144. Transistors 130 and 132 are connected with a common emitter resistor 146. The base of transistor 132 is supplied with a regulated adjustable voltage from a potentiometer 148 connected across a zener diode 150 supplied with direct current voltage through a resistor 152 from the direct current voltage source at terminal 154.

The control amplifier 36 operates to control the attenuator 30 in a manner to maintain a substantially constant DC level at the output 34A of amplifier 34, whenever there is sufficient input signal, at the input of the receiver, to accomplish that purpose. Assuming the DC output level at 34A is to be maintained at a constant 5.5 volts, the potentiometer 148 within amplifier 36 is set at the 5.5 volt level and the system operates to attempt to balance the voltages within the system to maintain the output voltage at connection 34A, connected to the base of transistor 130, at this same level.

If the DC level of the output signal at 34A is very low, indicating possibly a weak input signal to the receiver, the transistor 130 is relatively unconductive, and there is very little voltage drop through the emitter resistor 146 on account of conduction in transistor 130. This low voltage drop in resistor 146 tends to increase the emitter-to-base voltage of transistor 132 and to turn on transistor 132, increasing the drop across the associated collector resistor 140. That 140 voltage constitutes the emitter-to-base voltage of transistor 136, and the increase of that voltage turns on the transistor 136 to supply a strong current to the lamp 72 of the attenuator 68 causing a high illumination to the photoresistor 70 and providing a minimum of attenuation to allow a maximum signal to pass through the low pass filter and the amplifier 34.

As the signal becomes stronger, possibly occasioned by the fact that the receiver is brought closer to a transmitter, the output signal at 34A will reach, and may exceed, a DC level of 5.5 volts. When this happens, the transistor 130 is turned on, the transistor 132 tends to be turned off, and the conduction of transistor 136 is reduced, thus reducing the current in lamp 72 and increasing the attenuation of the attenuator 68, to thus regulate the DC level of the output voltage at 34A. While the attenuator 30, the low pass filter 32, and the amplifier 34 are very capable of transmitting the audio signals which are desired for use in the system, the amplifier 36 and the lamp portion 72 of the attenuator 30 are intended to respond only to the average direct current level of the detected carrier signal at output connection 34A. This relative insensitivity to alternating current components is provided in large measure by the fact that the lamp filament 72 of the attenuator 68 has a time constant which is long enough to make it substantially insensitive to alternating current. However, a further smoothing effect is provided by a capacitor 156 connected at the base of the transistor 136. In one practical embodiment, this capacitor had a value in the order of 150 microfarads. Since control amplifier 36 and attenuator 30 operate together, they are sometimes referred to collectively herein as a scaling circuit.

FIG. 4 illustrates a preferred embodiment of the active low pass filter 32. In this filter, the transistors 158 and 160 form a current feedback pair. Similarly, the transistors 162 and 164 also form a current feedback pair. With the other components, these transistors and the associated circuit elements form a two-stage five-pole active Butterworth low-pass filter. Operating voltages are provided from a positive direct current source connected at terminal 166. A stabilized voltage source is provided by a zener diode 168 connected to the source terminal 166 through a dropping resistor 170. From this stabilized source there is connected a circuit including a resistor 172 and a diode 174 to the emitter of transistor 158 to compensate for emitter-base junction resistance changes due to temperature variations. The same function is provided for transistor 158 by a similar circuit including resistor 176 and diode 178. The filter includes series connected resistors 180, 182, 184, 186, and 188. The filter also includes shunt capacitors 190, 192, and 194. Included within the feedback circuit from the emitter resistor 196 of transistor 160 to the base of transistor 158, there is also an effective filter configuration including series resistors 198, and 200, and a shunt capacitor 202. A similar configuration is provided from the emitter resistor 204 of transistor 164 including series resistors 206 and 208, and a shunt capacitor 210. The output of the filter 32A appears across the collector resistor 212 of transistor 164 which is supplied from the stabilized voltage of zener diode 168.

In operation, if the incoming signal is at a relatively low level, transistor 158 is in low conduction, causing the base of transistor 160 to be high and putting that transistor into high conduction. This condition causes the base of transistor 162 to be high, putting that transistor into high conduction thus lowering the potential of the base of transistor 164 putting that transistor into low conduction and consequently providing a high voltage output at 32A. If transistor 164 is substantially completely turned off, the DC level of the voltage at 32A will be substantially equal to the stabilized DC voltage determined by the zener diode 168.

Since the filter 32 is an active filter, containing its own amplifiers, it is possible, with suitable adjustment of the output polarity, to omit the amplifier 34 and to simply provide all of the needed amplification within the filter 32. The normalizing amplifier may then be said to be merged into the filter.

The power supply to all of the circuits of FIGS. 2, 3, and 4 may be 16 volts positive direct current. When these circuits are simply added to an existing receiver, the power supply may be already available within the receiver.

While this invention has been shown and described in connection with particular preferred embodiments, various alterations and modifications will occur to those skilled in the art. Accordingly, the following claims are intended to define the valid scope of this invention over the prior art, and to cover all changes and modifications falling within the true spirit and valid scope of this invention.

We claim:

1. An improved radio receiver for receiving pulse modulated carrier signals comprising at least one radio frequency amplifier, a detector stage, and at least one audio stage, a peak detector circuit connected to receive signals from said radio frequency amplifier and operable to detect signal peaks and to set a control signal level determined by the amplitudes of said peaks, said peak detector being connected in a control loop to automatically control the gain of said radio frequency amplifier in accordance with said control signal level to prevent overloading of the receiver to thereby prevent signal distortion and clipping, a normalizing circuit connected between said detector stage and said audio stage, said normalizing circuit comprising a variable scale factor circuit means connected to receive signals from said detector stage;

said normalizing circuit also including a normalizing amplifier connected to supply signals to said audio stage, means serially connecting said normalizing amplifier to receive signals from said variable scale factor circuit means, and means connected from the output of said normalizing amplifier to control said variable scale factor circuit means, said scale factor circuit means being operable in response to the direct current level component of the output of said normalizing amplifier to vary the scale factor to maintain said direct current level component substantially constant.

2. A receiver as claimed in claim 1 wherein said peak detector circuit operates to respond with a fast rise and a slow decay in recognizing successive input signal peak values and in storing decayed voltage indications of those peak values, the instantaneous value of said decayed voltage indications comprising said control signal level.

3. A receiver as claimed in claim 1 wherein said variable scale factor circuit comprises a controlled variable attenuator.

4. A receiver as claimed in claim 3 wherein said attenuator comprises the combination of a photoconductor and a filament lamp device positioned and arranged to illuminate said photoconductor and to vary the conductivity thereof in accordance with said illumination.

5. A receiver as claimed in claim 3 wherein said scale factor circuit means includes a control amplifier operable to compare the DC level of the output of said normalizing amplifier with a standard voltage and operable to control said variable attenuator based on the difference voltage determined in said comparison.

6. A receiver as claimed in claim 1 wherein said means serially connecting said normalizing amplifier to receive signals from said variable scale factor circuit means comprises a low pass filter operable to pass the desired audio signal frequencies.

7. A receiver as claimed in claim 6 wherein said low pass filter comprises an active Butterworth filter.

8. A peak detecting and normalizing circuit unit adapted to be added to a radio receiver for improving the operation of the receiver in receiving pulse modulating carrier signals and comprising a peak detector circuit arranged to be connected to receive signals from a radio frequency amplifier of the receiver and operable to detect signal peaks and to set a control signal level determined by the amplitudes of said peaks, said peak detector being arranged to be connected in a control loop to automatically control the gain of at least one radio frequency amplifier of the receiver in accordance with said control signal level to prevent overloading of the receiver to thereby prevent signal distortion and clipping, a normalizing circuit arranged to be connected between a detector stage and an audio stage of the receiver, said normalizing circuit comprising a variable scale factor circuit means connected to receive signals from the receiver detector stage, said normalizing circuit also including a normalizing amplifier arranged to be connected to supply signals to the audio stage, means serially connecting said normalizing amplifier to receive signals from said variable scale factor circuit means, and means connected from the output of said normalizing amplifier to control said variable scale factor circuit means, said scale factor circuit means being operable in response to the direct current level component of the output of said normalizing amplifier to vary the scale factor to maintain said direct current level component substantially constant.

9. A unit as claimed in claim 8 wherein switching means are provided for connecting said peak detector circuit to control the gain of the radio frequency amplifier and for connecting the normalizing amplifier to the audio stage of the receiver, said switching means being operable alternatively to disconnect said peak detector circuit and said normalizing amplifier and to establish connections directly from the receiver detector stage to the audio amplifier and to an automatic gain control circuit of the receiver.

10. Circuits as claimed in claim 9 wherein said circuits are especially adapted for use with an ILS radio receiver, and wherein there is provided a microwave receiver system connected and arranged to receive microwave pulse modulated ILS signals and operable to translate the microwave frequency signals to the normal ILS frequencies, and switching means operable to switch the translated microwave signals into the first radio frequency amplifier of the receiver.

11. An improved radio receiver for receiving pulse modulated carrier signals comprising a peak detector circuit connected to operate exclusively in response to carrier signal peaks to automatically limit the gain of at least one radio frequency amplifier of said receiver to prevent overloading and distortion thereof despite a high ratio of peak carrier amplitude to average carrier amplitude, a normalizing circuit connected to derive from the carrier signal a direct current voltage level corresponding to the carrier signal level together with the audio output voltages, said normalizing circuit being operable to control the gain of the receiver so as to maintain said direct current voltage level substantially constant.

* * * * *